United States Patent [19]
Ohtomo et al.

[11] Patent Number: 6,163,373
[45] Date of Patent: Dec. 19, 2000

[54] ROTARY LASER IRRADIATING SYSTEM

[75] Inventors: Fumio Ohtomo; Kunihiro Hayashi, both of Tokyo-to, Japan

[73] Assignee: Kabushiki Kaisha TOPCON, Tokyo-to, Japan

[21] Appl. No.: 09/243,240

[22] Filed: Feb. 3, 1999

[30] Foreign Application Priority Data

Feb. 13, 1998 [JP] Japan .................................. 10-048650

[51] Int. Cl.$^7$ .................................................. G01C 1/00
[52] U.S. Cl. ............................................................ 356/147
[58] Field of Search ................................. 356/147, 148, 356/247, 248

[56] References Cited

U.S. PATENT DOCUMENTS 5,636,018   6/1997   Hirano et al. ............................ 356/248
5,825,555  10/1998   Oono et al. ............................. 359/668

Primary Examiner—Frank G. Font
Assistant Examiner—Michael P. Stafira
Attorney, Agent, or Firm—Nields & Lemack

[57] ABSTRACT

The present invention provides a rotary laser irradiating system, comprising a light emitter for emitting a laser beam, a rotator rotatably mounted on said light emitter for forming a laser reference plane by projecting and rotating the laser beam, and links for movably supporting said light emitter, wherein the links are tilted in such manner that it leans approximately toward the rotation center of said rotator, and the light emitter is movable approximately around said rotator. When the light emitter is tilted, the center of the rotator is not displaced almost at all within a predetermined range, and there is no need to compensate the position with respect to the target.

4 Claims, 6 Drawing Sheets

ROTARY LASER IRRADIATING SYSTEM

BACKGROUND OF THE INVENTION

The present invention relates to a rotary laser irradiating system for irradiating and rotating a laser beam at the same time and for forming a reference plane by the laser beam, and in particular, to a rotary laser irradiating system capable to form, in addition to a horizontal reference plane, a tilt setting plane tilted at a predetermined angle with respect to the horizontal reference plane.

A rotary laser irradiating system irradiates and rotates a laser beam toward a plane that is used as a reference and forms a reference plane by the laser beam. When the laser beam scans across a wall surface or the like, a locus of the laser beam is turned to a reference line on the reference plane. Therefore, in case the reference plane is a horizontal plane, the reference line is horizontal, and the height of the reference line is equal to the height of the reference plane, and the reference line is used as a reference for horizontality or height. By tilting a rotation axis of the laser beam, it is possible to form a reference plane tilted with respect to the horizontal plane. The tilt reference plane is used for positioning of a tilt plane for construction work in civil engineering, architectural engineering, etc.

The rotary laser beam irradiating system is vertically installed at a predetermined position or at a position used as a reference such as a reference point via a special-purpose stand or a tripod. As described above, the rotary laser irradiating system irradiates the laser beam in a horizontal direction and rotates it to form a horizontal reference plane. By tilting a rotation axis of the irradiated laser beam, a tilt reference plane is formed. Because the rotary laser irradiating system is used to form a horizontal reference plane or a tilt reference plane, it is provided with a high-accuracy tilt setting function to tilt the reference plane. Referring to FIG. 6, description will be given below on a conventional type rotary laser irradiating system.

FIG. 6 shows an essential mechanism of a rotary laser irradiating system 1. The rotary laser irradiating system 1 comprises a light emitter 2 for accommodating a light emitting element and an optical system and for emitting laser beam, a rotator 3 rotatably mounted on the light emitter 2 and irradiating and rotating the laser beam within a reference plane, tilt setting units 4 for performing leveling of the rotary laser irradiating system 1 and for setting tilt of the reference plane, and a tilt detecting unit 5 for detecting tilt of the rotary laser irradiating system 1 and a tilt angle of the light emitter 2.

On a part of the light emitter 2, a spherical unit 6 is formed, and the spherical unit 6 is tiltably supported on a receiving seat 7 (or gimbals), which has a spherical projection. On the upper end of the light emitter 2, the rotator 3 is rotatably mounted. A scanning gear 8 is fitted on the rotator 3, and the scanning gear 8 is engaged with a driving gear 11 of a scanning motor 9 provided on the light emitter 2. When the driving gear 11 is driven, the rotator 3 is rotated. The rotator 3 comprises a pentagonal prism 13, which reflects the laser beam emitted from the light emitter 2 and deflects it in a horizontal direction. By the pentagonal prism 13, the laser beam 14 is projected in a horizontal direction.

From the light emitter 2, two tilting arms 12 (one of them is not shown) are extended in a horizontal direction. The two tilting arms 12 and 12 cross each other perpendicularly and are connected respectively to the tilt setting units (one of them is not shown) as to be described later.

Description is now given on the tilt setting unit 4.

A tilting motor 16 mounted on the casing 15 of the rotary laser irradiating system 1 is connected to a tilt setting screw 18 via a gear train 17. On the tilt setting screw 18, a slide nut 19 is screwed, and the slide nut 19 is engaged with the tip of the tilting arm 12. When the tilting motor 16 is driven, the tilt setting screw 18 is rotated via the gear train 17. The slide nut 19 is moved up or down, and the light emitter 2 is tilted via the tilting arm 12. By two sets of the tilt setting units 4, tilt of the light emitter 2 can be set in any direction as desired.

Tilt angle of the light emitter 2 is detected by the tilt detecting unit 5 mounted on the lower end of the light emitter 2. The tilt detecting unit 5 comprises two tilt sensors 22 and 23 crossing each other perpendicularly and a tilt amount calculating unit (not shown) for detecting tilt of the light emitter 2 based on output signals from the tilt sensors 22 and 23. The driving of the tilting motor 16 is controlled according to the output from the tilt detecting unit 5. Tilt setting is achieved by driving the tilting motor 16 at an angle, which is converted to the number of pulses.

In the conventional type rotary laser beam irradiating system as described above, when the tilt setting unit 4 is driven for performing tilt plane setting and the light emitter 2 is tilted at a predetermined angle, the light emitter 2 is tilted around the center O of the spherical unit 6. Thus, as shown in FIG. 7, after the tilt setting of the pentagonal prism 13 (FIG. 7 (A)), the center is displaced from its position before the tilt setting (FIG. 7 (B)) by an amount of a horizontal displacement ΔH and by an amount of a vertical displacement ΔV. The vertical displacement ΔV is turned to an error in height of the reference plane, but it is small in value and can be easily compensated, and it causes no substantial problem. However, the horizontal displacement ΔH is an error which is large in value and may cause considerable deviation from the reference point already determined. Therefore, problems may arise in case a distance is measured using the irradiated laser beam or in case the measured value is used.

SUMMARY OF THE INVENTION

It is an object of the present invention to provide a rotary laser irradiating system, which causes less error in horizontal and vertical directions when tilt setting is performed.

The rotary laser irradiating system according to the present invention comprises a light emitter for emitting a laser beam, a rotator rotatably mounted on said light emitter for forming a laser reference plane by projecting and rotating the laser beam, and links for movably supporting said light emitter, wherein the links are tilted in such manner that it leans approximately toward the rotation center of said rotator, and the light emitter is movable approximately around said rotator. Also, in the rotary laser irradiating system according to the present invention, the links comprise an X direction link and a Y direction link, a movable base is movably supported via the X direction link so that it can be moved in X direction, the light emitter is movably supported on the movable base via the Y direction link so that it can be moved in Y direction, and the X direction link and the Y direction link are tilted in such manner that each plane including pivotal points of the X direction link or the Y direction link is tilted toward the center of the rotator. Further, in the rotary laser irradiating system of the present invention, the links are four links tilted toward the center of the rotator, and the four links are pivotally mounted by pivotal joint. Further, the rotary laser irradiating system of the present invention comprises an X movable pin protruding on the movable base, a Y movable pin protruding on the light emitter, an X direction tilt setting unit connected to the X movable pin and for displacing the X movable pin in X direction, and a Y direction tilt setting unit connected to the Y movable pin and for displacing the Y movable pin in Y direction. According to the rotary laser irradiating system of the present invention, in case the light emitter is tilted, the center of the rotator is not displaced almost at all within a predetermined range, and the position of the rotator is not deviated almost at all in case the light emitter is set to a predetermined tilt by the tilt setting unit. Therefore, there is no need to compensate the position with respect to the target.

DETAILED DESCRIPTION OF THE PREFERRED EMBODIMENTS

Figure 1:
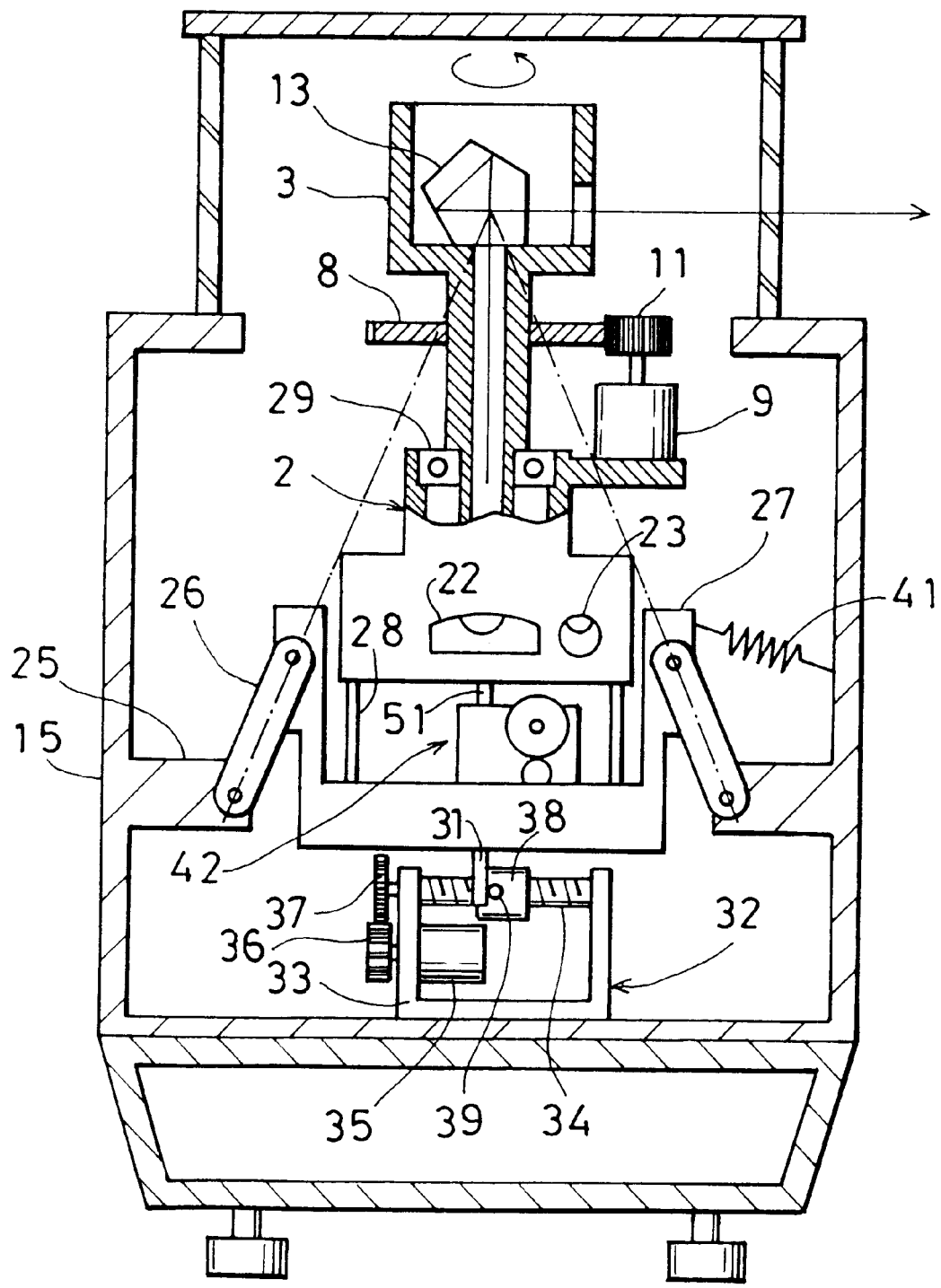
FIG. 1 is a cross-sectional view as seen from the front of an embodiment of the present invention.
Figure 2:
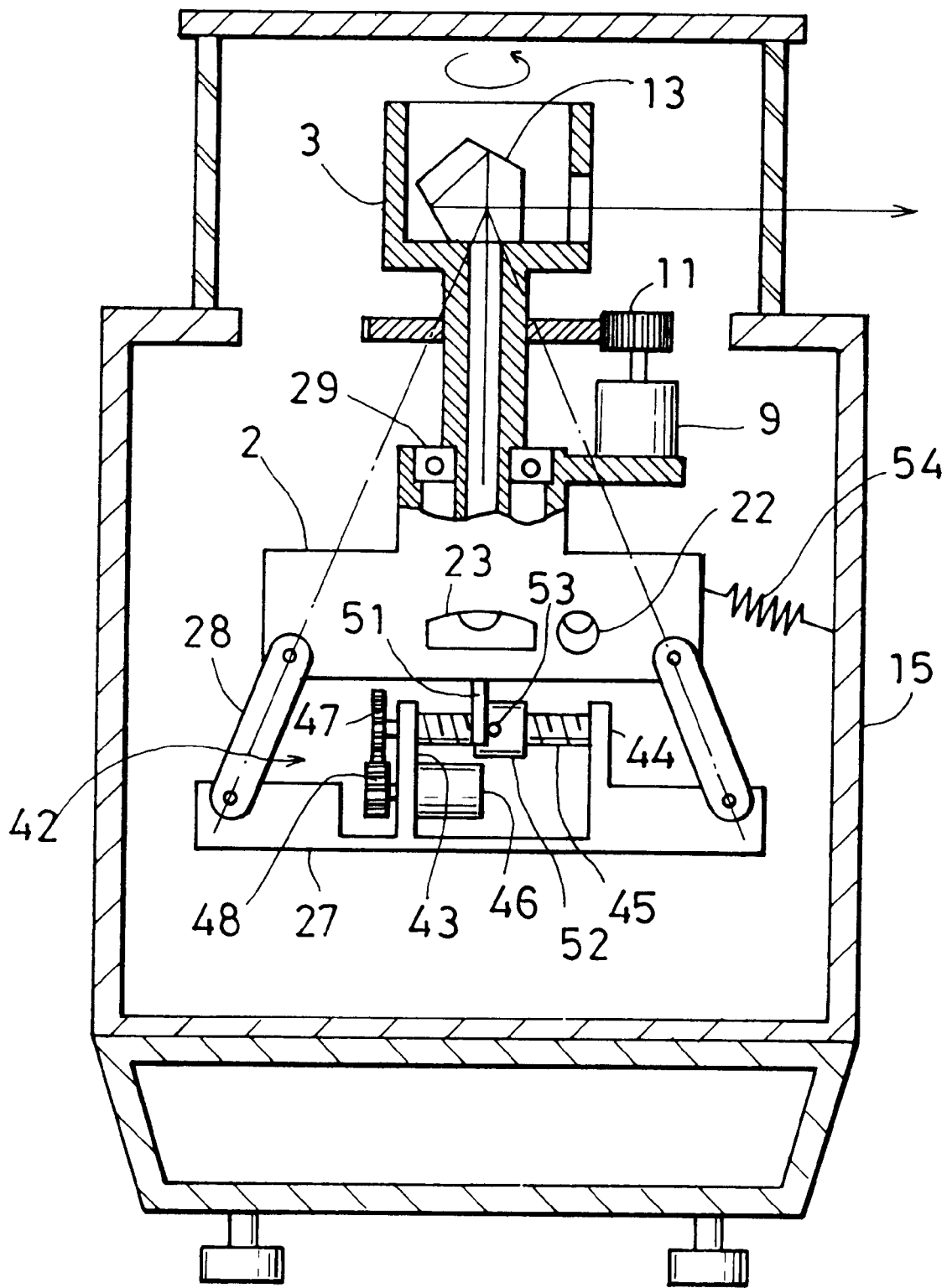
FIG. 2 is a lateral sectional view of the same embodiment without the lower portion of the figure.
Figure 6:
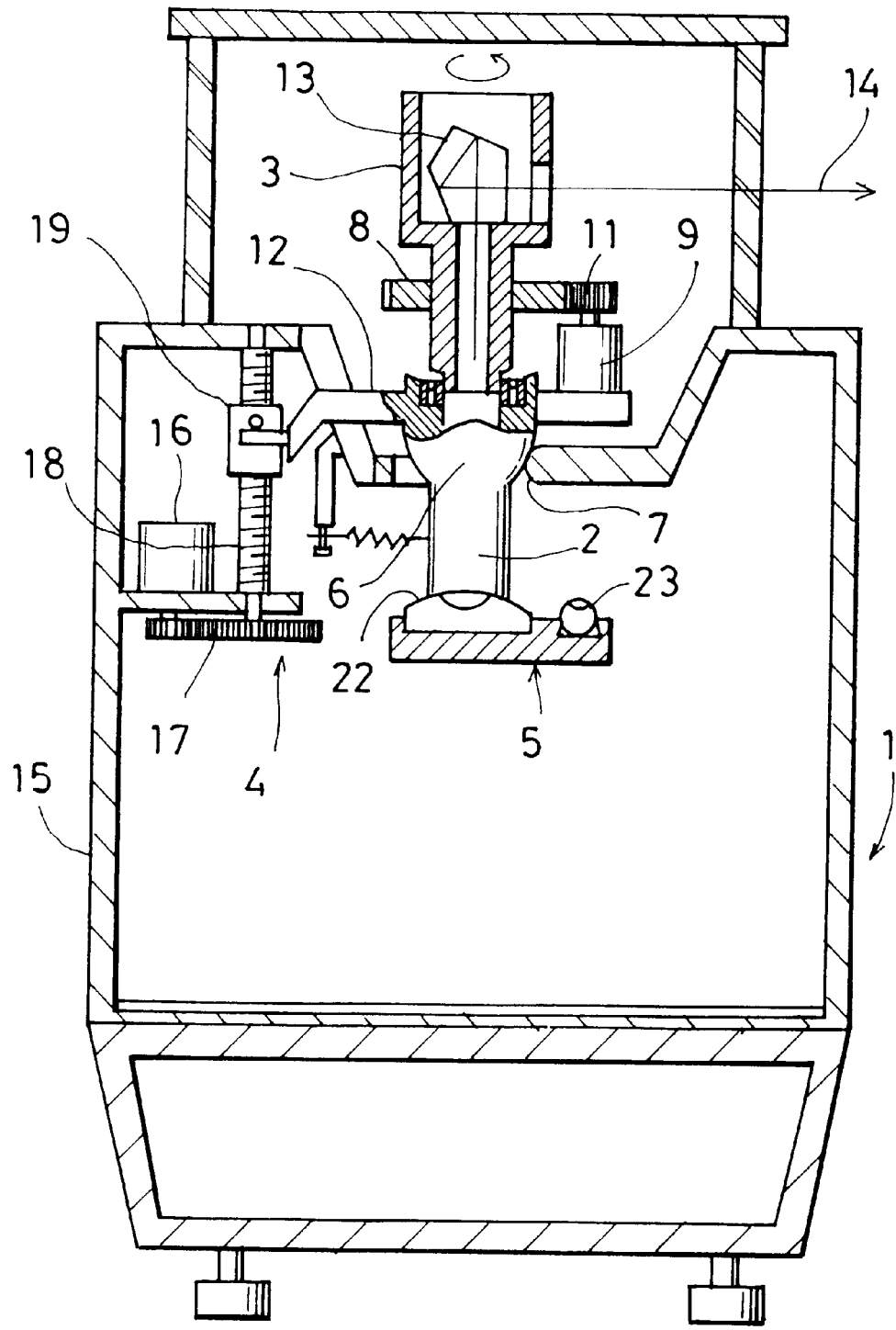
FIG. 6 is a cross-sectional view of an essential portion of a conventional type system.
Figure 7:
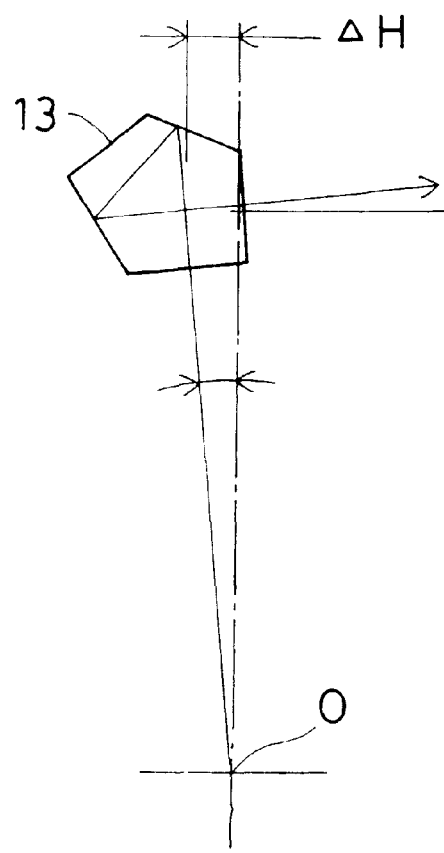
FIG. 7(A) and FIG. 7(B) each represents a drawing for explaining an operation of the conventional type system.
Figure 7:
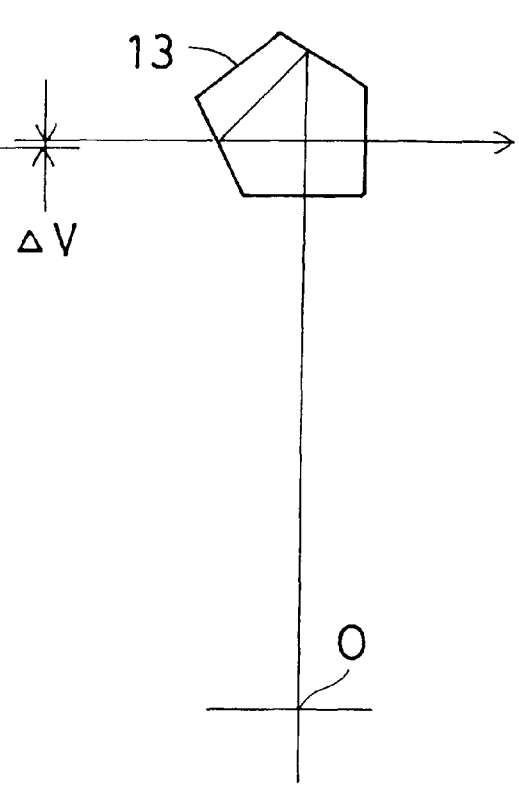

In the following, description will be given on embodiments of the present invention referring to the attached drawings:

In FIG. 1 and FIG. 2, the same components as in FIG. 6 are referred by the same symbols, and detailed description is not given here.

Inside a casing 15, a shelf piece 25 is provided horizontally. On the shelf piece 25, a movable base 27 is movably arranged via an X direction link 26 so that it can be moved in X direction. The movable base 27 is designed in U-shape (staple shape). The upper end of the X direction link 26 is pivotally mounted on the movable base 27, and the lower end of the X direction link 26 is pivotally supported on the shelf piece 25. The X direction link 26 comprises two sets of parallel links designed symmetrically and in equal-leg trapezoidal shape as shown in FIG. 1. When the movable base 27 is at a horizontal position, planes including 4 pivotal points of two links of each set cross each other at the center of the light emitter 2, i.e. at the center of a pentagonal prism 13.

On the movable base 27, the light emitter 2 is movably mounted so that it can be moved in Y direction via a Y direction link 28. The Y direction link 28 comprises two sets of parallel links designed symmetrically and in equal-leg trapezoidal shape as shown in FIG. 2. When the light emitter 2 is at a horizontal position, planes including 4 pivotal points of two links of each set cross each other at the center of the pentagonal prism 13 (at a point where laser beams cross each other in the pentagonal prism).

On the upper end of the light emitter 2, a rotator 3 is rotatably arranged via a bearing 29 so that it can be rotated around the optical axis of the laser beam, and the pentagonal prism 13 is mounted on the upper surface of the rotator 3.

An X movable pin 31 is provided on the lower surface of the movable base 27 and on an extension of the optical axis of the light emitter 2, and the X movable pin 31 is connected with an X direction tilt setting unit 32 which is to be described later. The X direction tilt setting unit 32 is mounted on the bottom surface of the casing 15.

In the following, the X direction tilt setting unit 32 will be described.

On a bracket 33 fixed on the bottom surface of the casing 15, an X screw rod 34 is rotatably mounted and an X tilt setting motor 35 is mounted. On the output shaft of the X tilt setting motor 35, a driving gear 36 is fitted, and a driven gear 37 is fitted on the X screw rod 34, and the driving gear 36 is engaged with the driven gear 37. The axis of the X screw rod 34 is extending in X direction and this corresponds with the moving direction of the movable base 27. An X slide nut 38 is screwed on the X screw rod 34, and an X connecting pin 39 protruding on the X slide nut 38 is engaged with the X movable pin 31. A tension spring 41 is stretched between the movable base 27 and the casing 15. The resilient force of the tension spring 41 is applied in lower rightward direction in FIG. 1, i.e. in such direction that the X movable pin 31 is brought into contact with the X connecting pin 39 and that jolting of the pivotal points of the X direction link 26 is reduced.

A Y direction tilt setting unit 42 is provided on the movable base 27.

On the movable base 27, brackets 43 and 44 are provided, and a Y screw rod 45 having an axis extending in Y direction is rotatably mounted between the brackets 43 and 44, and a Y tilt setting motor 46 is disposed on the bracket 43. A driven gear 47 is fitted on the Y screw rod 45, and a driving gear 48 is fitted on the output shaft of the Y tilt setting motor 46, and the driving gear 48 is engaged with the driven gear 47.

On the lower surface of the light emitter 2, a Y movable pin 51 is protruding on an extension of the optical axis of the rotator 3. A Y slide nut 52 is screwed on the Y screw rod 45, and a Y connecting pin 53 protruding from the slide nut 52 is engaged with the Y movable pin 51. A tension spring 54 is stretched between the light emitter 2 and the casing 15. The resilient force of the tension spring 54 is applied in lower rightward direction in FIG. 2, i.e. in such direction that the Y movable pin 51 is brought into contact with the Y connecting pin 53 and that jolting of the pivotal points of the Y direction link 28 is reduced.

When the X tilt setting motor 35 is driven to rotate the X screw rod 34 via the driving gear 36 and the driven gear 37 and the slide nut 38 is slid, the movable base 27 is moved approximately around the center of the pentagonal prism 13. When the Y tilt setting motor 46 is driven to rotate the Y screw rod 45 via the driving gear 48 and the driven gear 47 and Y slide nut 52 is slid, the light emitter 2 is moved approximately around the center of the pentagonal prism 13.

Now, description will be given on operation of the system referring to FIG. 3.

In case tilt setting of the reference plane is performed, e.g. in case tilt setting in Y direction is performed, the Y tilt setting motor 46 is driven by a control unit (not shown) and the Y screw rod 45 is rotated in a predetermined direction to move the Y slide nut 52, and the Y movable pin 51 is horizontally displaced against the force of the tension spring 54. For example, when the Y movable pin 51 is displaced toward the left in FIG. 2, the Y direction link 28 at the left is rotated counterclockwise, and the pivotal point closer to the upper end is displaced upward and leftward. Also, the Y direction link 28 on the right is rotated counterclockwise, and the pivotal point closer to the upper end is displaced downward and leftward. Therefore, the light emitter 2 is tilted depending on the amount of movement of the Y slide nut 52. The amount of tilting of the light emitter 2 is detected by the tilt sensors 22 and 23, and the result of the detection is fed back to the control unit. As a result, the driving of the Y tilt setting motor 46 is controlled, and the tilting is turned to a preset input value.

With regard to the tilt setting in X direction, the procedure is the same as that of Y direction, and detailed description is not given here.

Figure 3:
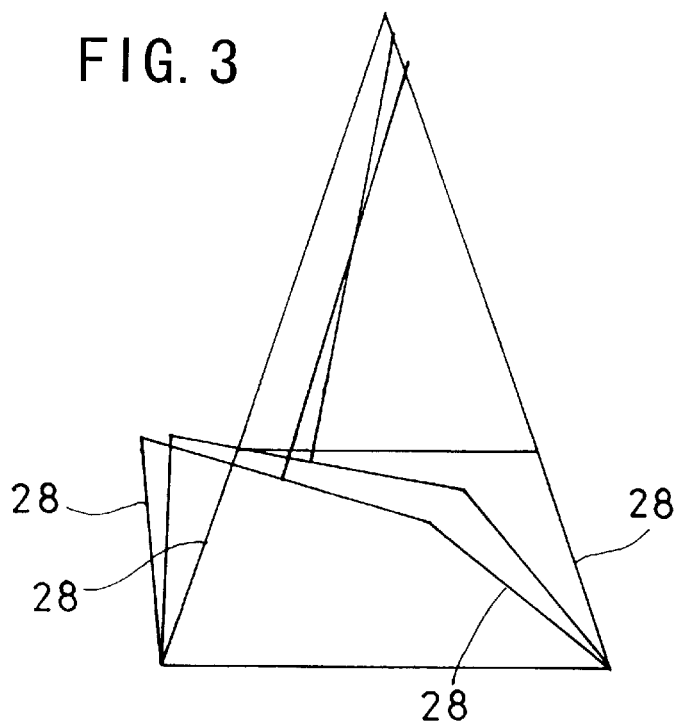
FIG. 3 is a drawing for explaining an operation of the embodiment of the invention.
Figure 4A:
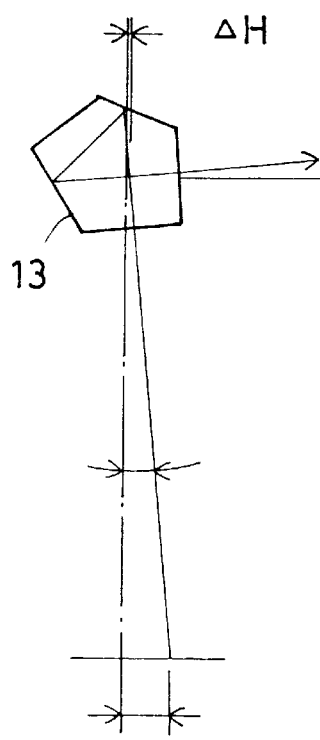
FIG. 4(A) and FIG. 4(B) each represents a drawing for explaining the embodiment.
Figure 4B:
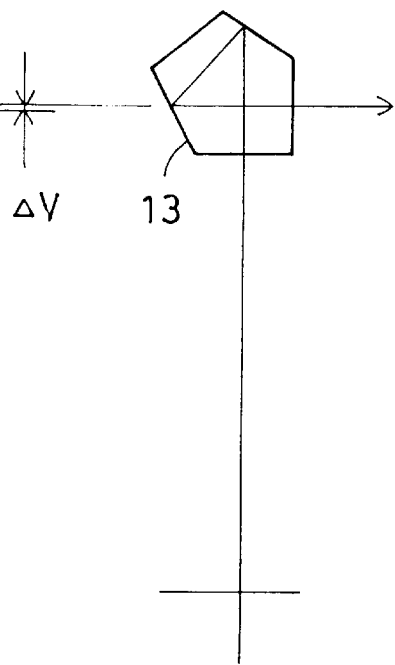

In the tilt setting operation as described above, in case the range of the tilt angle (the range of actual tilt setting) is not large as shown in FIG. 3, and the center of the pentagonal prism 13 is not displaced almost at all. Therefore, in case tilt setting is performed in the actual application range, there is practically no problem in the positional deviation of the pentagonal prism 13. In particular, as seen FIG. 4(A) and FIG. 4(B), the displacement in a horizontal direction is very small, and this contributes to improvement of accuracy and measurement reliability in the measurement of distance by using the laser beam. Although there is a slight displacement in a vertical direction, the displacement in a vertical direction can be detected by visual inspection or by the equipment at the light receiving side and proper correction can be made, and hence no trouble occurs.

In the above embodiment, on the movable base 27 movable in X direction, the light emitter 2 is movably arranged so that it can be moved in Y direction, while the light emitter 2 may be movably supported so that it can be moved in two directions of X and Y. The Y movable pin 51 and the X movable pin 31 are arranged on an extension of the optical axis of the light emitter 2, whereas it is needless to say that these can be arranged at any position if the displacement can be movably transmitted. It is also possible to move the predetermined values of ΔH and ΔV by changing the intersection of the links.

Figure 5:
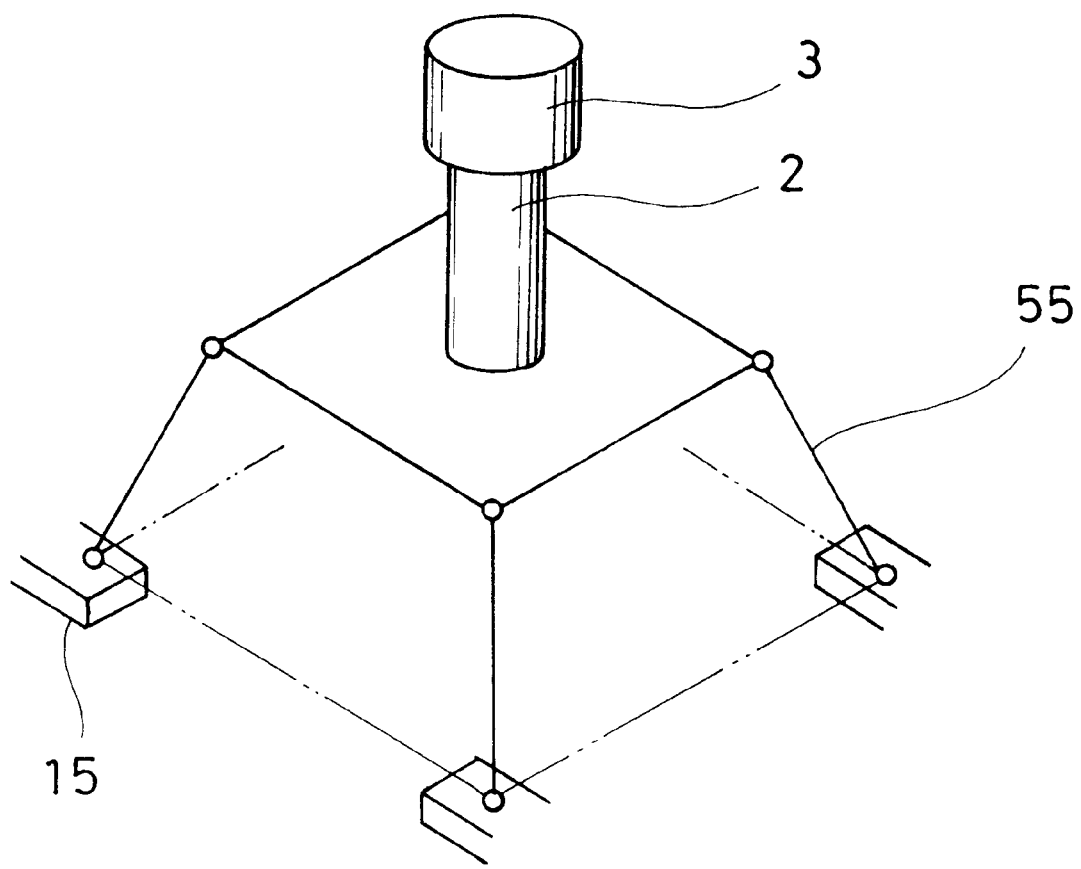
FIG. 5 is a drawing schematically illustrating another embodiment of the present invention.

Referring to FIG. 5, brief explanation will be given now on another embodiment.

With the upper ends of the four links 55 pivotally joined to the light emitter 2, the links 55 are pivotally arranged so that these can be tilted in any direction. The pivotal points of the upper ends are determined in such manner that these are positioned at four vertexes of a right-angled quadrangle. Further, the lower ends of the links 55 are pivotally joined to the casing 15, and the links 55 are pivotally arranged so that these can be tilted in any direction. The pivotal points of the lower ends are determined in such manner that these are positioned at four vertexes of four sides of a quadrangle, which is larger than the above right-angled quadrangle, and that extensions of the links 55 cross each other at the center of the pentagonal prism 13. When the light emitter 2 is at a vertical position, the links 55 correspond to leg sides of a right-angled quadrangular pyramid. When the X movable pin 31 protruding from the lower surface of the light emitter 2 is displaced in a predetermined direction, it is possible to tilt the light emitter 2 in the predetermined direction.

As described above, according to the present invention, the center of the pentagonal prism is not displaced almost at all when tilt setting is performed, and there is no need to compensate for the reference point. Accordingly, errors can be avoided, and it is possible to improve accuracy and to achieve higher working efficiency.

What is claimed is:

1. A rotary laser irradiating system, comprising a light emitter for emitting a laser beam, a rotator rotatably mounted on said light emitter for forming a laser reference plane by projecting and rotating the laser beam, links for movably supporting said light emitter, and a tilt setting unit for moving said light emitter, wherein said links are arranged in a trapezoidal shape in such manner that said light emitter can move approximately around said rotator.

2. A rotary laser irradiating system according to claim 1, further comprising a movable base, wherein said links comprise a first set of X direction links and a second set of Y direction links, said tilt setting unit comprises an X direction tilt setting unit and a Y direction tilt setting unit, said light emitter being supported on said movable base via said X direction links so that said light emitter can be moved in the X direction, said movable base being supported via said Y direction links so that said movable base can be moved in the Y direction, said X direction tilt setting unit being adapted to move said light emitter in the X direction, and said Y direction tilt setting unit being adapted to move said light emitter in the Y direction.

3. A rotary laser irradiating system according to claim 1, wherein said light emitter is supported by links being pivotally jointed so that said light emitter is movable.

4. A rotary laser irradiating system according to claim 1, wherein said rotator comprises a pentagonal prism for deflecting and projecting said laser beam, and said rotator is movable approximately around said pentagonal prism.

* * * * *